United States Patent [19]

Edelbruck et al.

[11] Patent Number: 4,589,554

[45] Date of Patent: May 20, 1986

[54] SELF-CALIBRATING PRODUCTS SYSTEM AND METHOD

[75] Inventors: Pierre Edelbruck, Kingersheim; Georges Melzac, Illzach; Bernard Caullet, Pfastatt, all of France

[73] Assignee: Manufacture de Machines du Haut-Rhin, Mulhouse, France

[21] Appl. No.: 523,040

[22] Filed: Aug. 12, 1983

[30] Foreign Application Priority Data

Aug. 12, 1982 [FR] France ................................ 82 14047

[51] Int. Cl.[4] ......................... B07C 5/00; G05B 23/02

[52] U.S. Cl. .................................... 209/546; 209/551; 364/552; 364/579

[58] Field of Search ....................... 209/546, 548, 551; 364/550, 551, 552, 579, 580, 571

[56] References Cited

U.S. PATENT DOCUMENTS

| | | | |
|---|---|---|---|
| 3,946,212 | 3/1976 | Nakao et al. | 364/552 |
| 4,155,116 | 5/1979 | Tawfik et al. | 364/579 X |
| 4,331,026 | 5/1982 | Howard et al. | 364/571 X |
| 4,397,021 | 8/1983 | Lloyd et al. | 364/580 X |

OTHER PUBLICATIONS

*Automatic Cartridge Case Inspection and Process Control Monitor,* W. J. Coleman and K. L. Swinth, SPIE, vol. 122, Advances in Laser Engineering (1977), pp. 33–44.

*Primary Examiner*—Robert B. Reeves
*Assistant Examiner*—Edward M. Wacyra

[57] ABSTRACT

An installation for continuous flow manufacture comprising a feeding unit, (MA) at least one working unit (MT) having a working carousel (MT14) having 10 working seats, and at least one inspecting unit having an inspecting carousel (MC12) having eight inspecting seats. The measured information, emitted by the inspecting unit are reference marked modulo (1) and modulo (8), utilized in real time for surveillance of the machine.

9 Claims, 14 Drawing Figures

SELF-CALIBRATING PRODUCTS SYSTEM AND METHOD

CROSS REFERENCE TO RELATED APPLICATION

This application is related to co-pending application Ser. No. 523,038 filed on the same date as the present application.

FIELD OF THE INVENTION

The present invention relates to a mass-production system. More particularly this invention concerns a method of calibrating such a system.

BACKGROUND OF THE INVENTION

In mass production the workpieces, for instance small-arms ammunition, are arranged in a single row by rotary conveyors, formed with spaced seats, adjacent to working stations set up to act sequentially on the workpieces. As is known, a rotary conveyor takes a workpiece into one of its seats at a location along its periphery and transfers it, at another location, to another such rotary conveyor or to a working station. In addition a workpiece can move from a working station to a rotary conveyor to go toward another working station or to a receptacle. The essential advantage of mass production is to increase the production rate while reducing costs. Nonetheless the continuous movement of the workpieces poses delicate timing and testing problems.

OBJECT OF THE INVENTION

It is therefore an object of the present invention to provide an improved production system.

Another object is the provision of such a production system which operates very accurately, and which can even calibrate itself.

A further object is to provide a system with exact physical and temporal spacing between adjacent workpieces as well as accurate inspection of them in a mass-production manufacturing operation.

SUMMARY OF THE INVENTION

In an installation for assembly-line manufacture according to the invention, workpieces move in a row along a production path at a generally uniform spacing. A feed means (or unit) holds a supply of workpieces and places then one at a time in a predetermined position in the seats of an input rotary feed conveyor. An inspecting means (or unit) defines a portion of the continuous production path for the workpieces and inspects the workpieces as they pass therealong. The inspecting unit itself includes an intake rotary conveyor cooperating with the feed conveyor, an output rotary conveyor, and at least one inspecting carousel between the intake and output conveyors. A controller supervises and coordinates the operation of the other means (or units) on the workpieces as same move along the production path. A calibrating means (or unit) serves to periodically create gaps in the production line or workpieces upstream of the inspecting carousel and to insert a minimum-size gage piece into one of the gaps and a maximum-size gage piece into another gap at a location upstream of the inspecting carousel, the inspecting carousel then measuring the sizes of the gage pieces on the inspecting carousel, and establishing, from the measured sizes of the gage pieces, maximum- and minimum-size limits. A rejecting means (or unit) along the production path downstream of the inspecting carousel removes from the production path, workpieces whose sizes lie outside the range of the size limits established based on the gage-piece sizes.

Thus the calibrating method according to this invention includes the steps of periodically creating at least two gaps in the production line of workpieces upstream of the inspecting carousel, inserting a minimum-size gage piece into one of the gaps and a maximum-size gage piece into the other gap upstream of the inspecting carousel, measuring the sizes of the gage pieces on the inspecting carousel, and establishing, from the measured sizes of the gage pieces, new maximum- and minimum-size limits. Thus during a subsequent production run the new limits are used to establish the acceptable non-reject range.

According to another feature of the invention, the inspecting carousel and the intake and output conveyors each have a plurality of workpiece-receiving seats equispaced about a center. The calibrating unit includes recycling means, including a recycling conveyor, connected between the intake and output conveyors, for taking the gage pieces from the latter and circulating them back to the former. Thus the conveyors and inspecting carousel define a closed recycling circuit having a predetermined number of generally equispaced positions. According to a feature of this invention, the number of positions of the recycling circuit and the number of seats of the inspecting carousel having no common whole-number divisor other than one. In this manner, after the gage pieces have circulated that number of times equal to the number of seats of the inspecting carousel, every seat thereof will have been recalibrated.

A working means (or unit) is provided, according to this invention, between the fed unit and the inspecting carousel. This working unit includes an upstream rotary conveyor for receiving workpieces from the input feed conveyor, a working carousel for receiving workpieces from the upstream rotary conveyor and including means for working on the workpieces, and a downstream rotary conveyor for receiving workpieces from the working carousel and passing them to the intake rotary conveyor of the inspecting unit.

The inspecting unit of this invention includes at least one measuring element displaceable, relative to the inspection carousel, into and out of contact with the workpieces thereon and carrying a target jointly displaceable with the measuring element, and means, such as a Foucault-current sensor, for measuring the distance from the target to a fixed location when this measuring element is engaging a workpiece. A further target may be fixed to the inspecting carousel to allow verificiation of carousel position and a general check on operation.

Means are also provided for displaying the workpiece sizes, and can do so in any normal measurement system, while forming part of an input-output system having a control board allowing process control.

The controller or control unit itself is also connected to the calibrating and rejecting unit for controlling the same. This control unit has a nonvolatile memory for the various limits, so that if shut down, the machine does not have to be recalibrated. In addition, test pieces like the gage pieces can be introduced into the production line at any time to test it.

The control unit includes, for each other unit, a respective first logic arrangement and has also a second logic arrangement connected to the first logic arrangement.

Thus the instant invention enables the performance of a complete calibration of the machine in one automatic operation, simply by using one minimum-size gage and one maximum-size gage. The number of measurements made may be greater than the number of sensors, as several such targets as described above can be employed to measure several different size ranges.

Once production is under way, the targets fixed on the carousel, as they are juxtaposed with the sensors, give readings that enable any drift of values, whether caused by electronic variations or mechanical and thermal problems, to be sensed and cancelled out.

In addition, it is possible at any time to insert into the production line of workpieces, test pieces, which just can be perfect workpieces, or to pull out and check a workpiece. At any time, the operator can check the production equipment and the workpiece size.

DESCRIPTION OF THE DRAWING

The above and other features and advantages will become more readily apparent from the following, reference being made to the accompanying drawings in which.

SPECIFIC DESCRIPTION

Mechanical Elements

Figure 1:
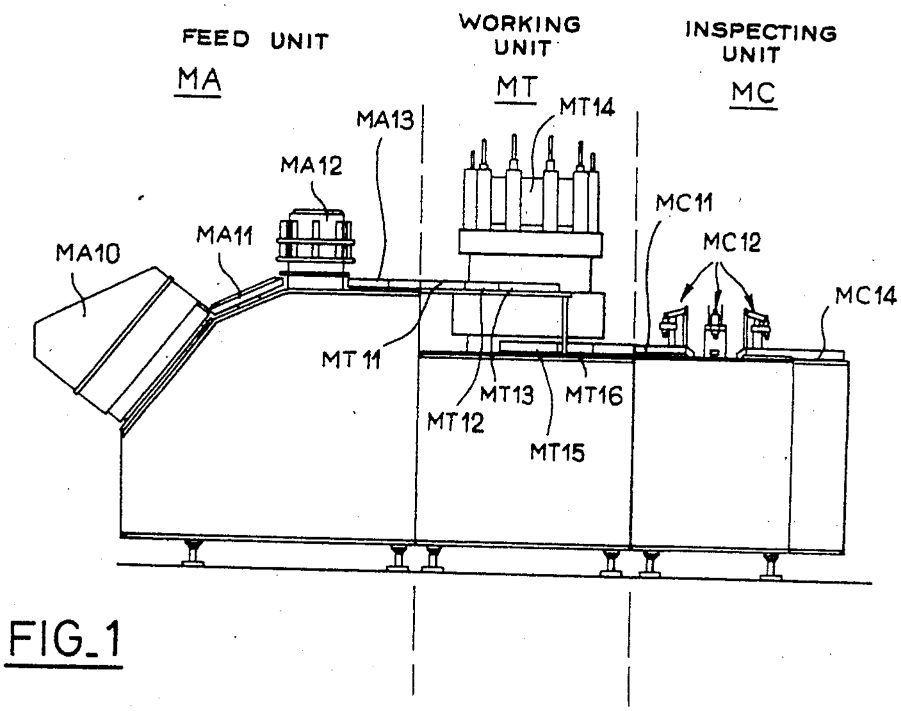
FIG. 1 is a largely schematic small-scale side view of the apparatus of this invention.
Figure 2:
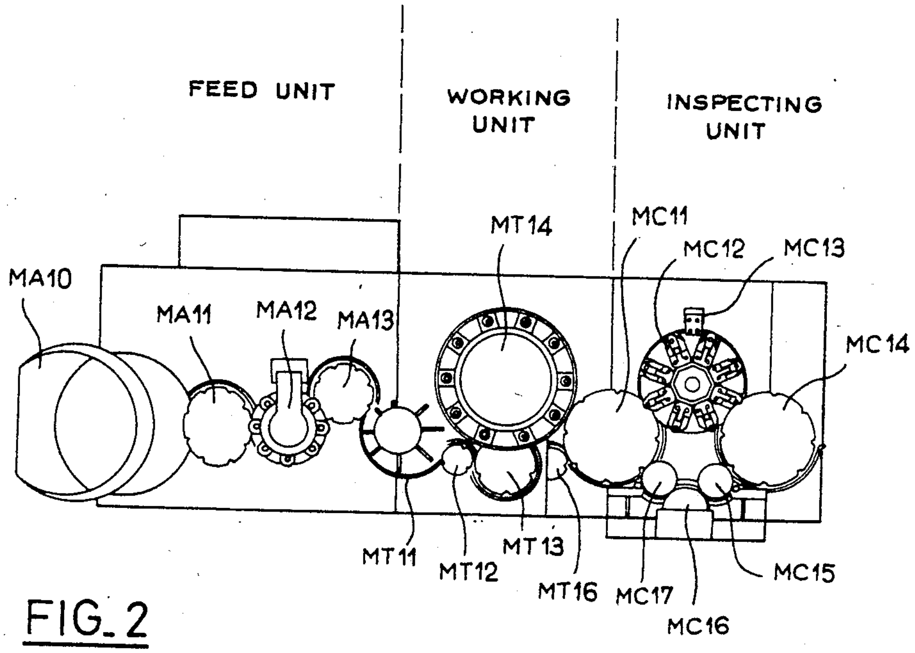
FIG. 2 is a top view of the apparatus of FIG. 1.

As seen in FIGS. 1 and 2, a mass-production installation has the following basic structures:

A feed unit (or means) MA holds, in a hopper MA10, a supply of workpieces (seen at 1200 in FIG. 4) to be machined, and places them in a predetermined position in an input rotary conveyor wheel MA 13. Between the supply hopper MA10 and the input rotary conveyor wheel MA13, there can be other transfer wheels MA11 or working wheels MA12. The wheel MA12 serves to verify that the workpiece, for example the empty cartridge casing, has been positioned right-side up, that is, with its mouth facing up.

At least one working unit MT forms another part of the working path of the production line of workpieces, between an upstream rotary-conveyor wheel MT11, cooperating with the input rotary conveyor wheel MA13, and a downstream rotary-conveyor wheel MT16. At least one working carousel MT14 is provided between the upstream and downstream rotary-conveyor wheels MT11 and MT16. This working carousel MT14 serves to perform at least one machining or manufacturing operation on the workpieces as they pass thereby. Other wheels MT12, MT13, and MT15 are used in the working unit MT to transfer the workpieces between its input and its output. Usually the working unit MT moves the workpieces vertically, as shown in particular in FIG. 1 where the wheels MT12 and MT13 are higher than the wheels MT15 and MT16.

Finally FIGS. 1 and 2 show an inspecting unit MC which also defines part of the production path of the workpieces between an intake rotary-conveyor wheel MC11 and an output rotary-conveyor wheel MC14. The wheel MC11 cooperates with the downstream wheel MT16 of the working unit MT. At least one inspecting carousel MC12 is provided between the intake wheel MC11 and the output wheel MC14 for a measuring operation relating to the above-mentioned work that had been performed by the working carousel MT14. The inspecting carousel MC12 cooperates with a measuring means or sensor MC13 in a manner described below with reference to FIG. 4. Finally, according to a particular aspect of the invention, the inspecting unit MC has other wheels MC15, MC16, and MC17 which are provided between the output wheel MC14 and the intake wheel MC11.

In the preceding, the various rotary-conveyor wheels have been defined as to function, for example the feed wheel for the feed unit MA, upstream and downstream wheels for the working unit MT, and intake and output wheels for the inspecting unit MC. The person skilled in the art will understand that this terminology is only used to allow easy recognition of the various elements, since these wheels can be virtually identical.

By way of example, the feed unit MA can be the type described in the following French patent publication Nos: 2,346,072; 2,356,464; 2,379,335; or 2,376,049. Another patent of interest is French Pat. No. 2,463,081.

The device described in publication No. 2,379,335 allows selective ejection of the workpieces. This is particularly interesting for the invention as described below to create empty spaces or gaps in the succession of workpieces along the production path. Another way of making empty spaces is described in publication No. 2,459,296.

The working unit MT can, for example, be one of the machines described in French patent publication Nos. 2,333,412; 2,330,476; and 2,475,946. In the detailed description that follows, it is assumed that the machine incorporating the invention is for cutting tubular workpieces, such as cartridge casings, this simple operation being conducted by a machine such as seen in publication No. 2,333,412.

SPECIFIC DESCRIPTION OF INSPECTING UNIT

Figure 3:
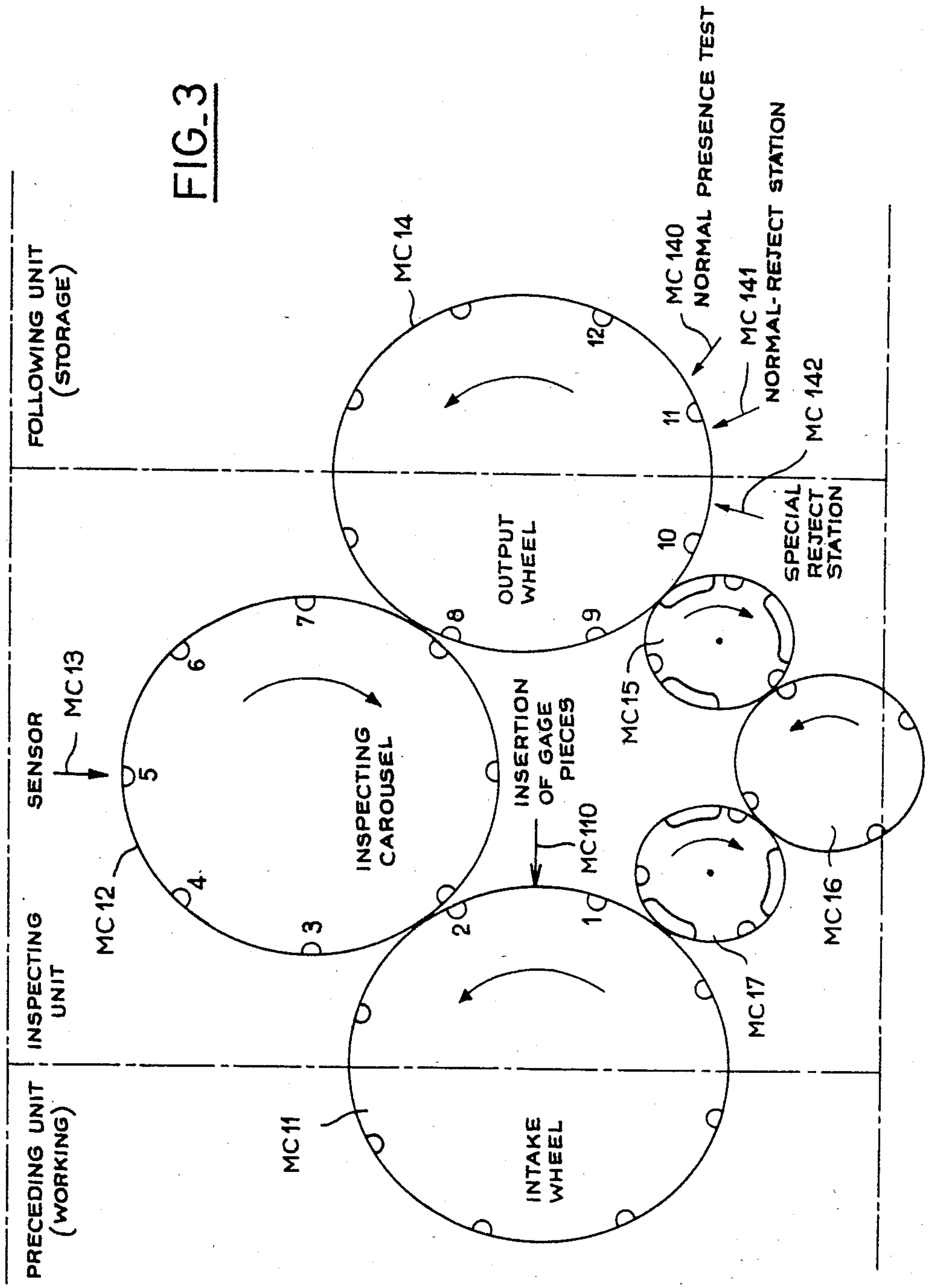
FIG. 3 is a large-scale schematic view of a detail of FIG. 2.

As best seen in FIG. 3, the inspecting unit MC includes the intake wheel MC11 followed by the inspecting carousel MC12, cooperating with the sensor MC13, and the output wheel MC14. The wheel MC11 thus takes the workpieces from a preceding unit, which is normally a working unit MT. These workpieces pass around the inspecting carousel MC12 which measures them at the sensor MC13. Finally the workpieces are taken back by the output wheel MC14 which either transfers them to a following unit (working or another inspecting unit) or puts them in storage. The output wheel MC14 has a normal-reject station MC141 which is preceded by a special-reject station MC142, the normal-reject station MC141 being followed by a presence-detecting station MC140 which verifies that the rejection operation has been carried out and which also assures that the workpieces to be transferred downstream have all been accepted. The reject devices can be of the type described in the abovecited publication No. 2,379,335.

Upstream of the stations MC140–MC142, the seats of the output wheel MC14 merge with those of a transfer wheel MC15 followed by another transfer wheel MC16 and then by a third tranfer wheel MC17 which itself feeds the workpieces to the intake wheel MC11.

Thus in the inspecting unit MC, there are wheels MC15–MC17 forming a recycling unit which can selectively send workpieces from the output wheel MC14 to the intake wheel MC11. For effective recycling, it is enough to provide deflectors between the wheels MC15 and MC14 and between the wheels MC11 and MC17.

Finally, the input wheel MC11 has a station MC110 for the insertion of standard-size pieces or gage pieces. This can be done, for example, by means of a chute extending tangentially above the path of the seats and allowing a gage piece to slide down into one of the seats.

MEASURING UNIT

Figure 4:
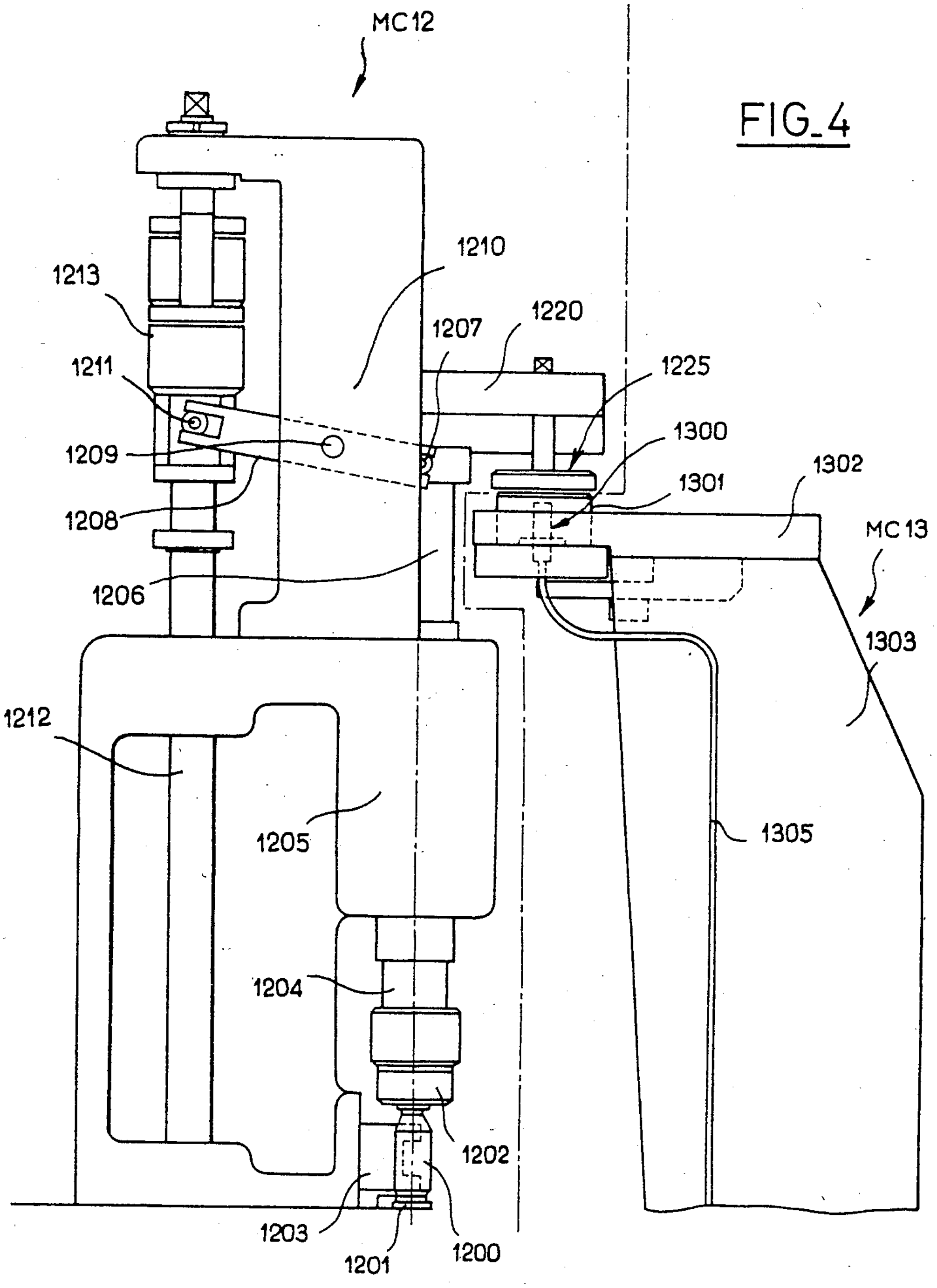
FIG. 4 is a large-scale end view of a detail of FIG. 1.

With reference to FIG. 4, the measuring unit MC13 is juxtaposed with one location along the inspection carousel MC12, only one of whose seats being shown. The illustrated seat is juxtaposed with the measuring unit MC13.

Each seat of the carousel MC12 has a cast-iron support with parts 1205 and 1210 positioned on the body of the carousel, seen at the bottom. The part 1205 is provided with a vertically through-bore through which a cylindrical releasing sleeve 1204 slidably fits. This sleeve 1204 is provided with an end 1202 which presses a workpiece, here a cartridge casing 1200, against a support member 1201. Transversely, the casing 1200 is gripped by jaws 1203. The sliding part 1204 has an upper part 1206 and is provided thereat with a coupling pin 1207 for engaging a link 1208 pivotally mounted at 1209 on the frame 1210. The other end of the link 1208 pivots on the pin 1211 of an assembly 1212 and 1213 which form a means for urging the left part of the link 1208 upward. During rotation of the carousel MC12, an unillustrated cam is effective to urge the elements 1204–1206 downward, thereby vertically compressing the casing 1200 to enable the measuring of its height after a cutting operation already mentioned which had taken place just upstream of the measuring station MC13.

The part 1206 is provided, on its upper end, with a strirrup 1220 on which is fixed a target 1225, formed as a steel disk with accurately parallel faces.

The measuring station MC13 includes a frame 1303, fixed relative to the inspecting unit MC, the upper part of which supports a measuring device 1301 comprising a cylindrical cage of a shape comparable to the periphery of the target 1225. This cage is provided internally with a sensor 1300 which measures the distance between itself and the target 1225. The sensor 1300 is connected by a line 1305 to the rest of the equipment.

The position of the target 1225 is determined by the vertical position of the part 1204 which, in turn, is determined by the height of the casing 1200 whose lower end is sitting on the support of the carousel MC12 which itself does not move vertically as it rotates relative to the measuring station MC13.

In a preferred embodiment, the sensor 1300 may be a Foucault-current detector such as the sensor commercially available from Vibro-Meter under the tradename Vibrax TQ102. This sensor 1300 is connected by the cable 1305 to a treatment system which can be of the type sold by the same company under the trade designation IQS603.

In this manner, the sensor 1300 measures the distance between itself and the target 1225.

A major problem is to take into account the different vertical components in the rotary movement of the carousel MC12 as well as the variations of same and drifts that can affect the mechanical dimensions principally as a function of temperature and other factors.

For this, the instant invention provides a combination of means of which certain have already been described.

In addition, there is provided, on the inspecting carousel MC12 for each measurement, at least one or preferably two unillustrated fixed targets. These targets are mounted like the target 1225 but on the support 1210 which is fixed on the carousel MC12.

Figure 5:
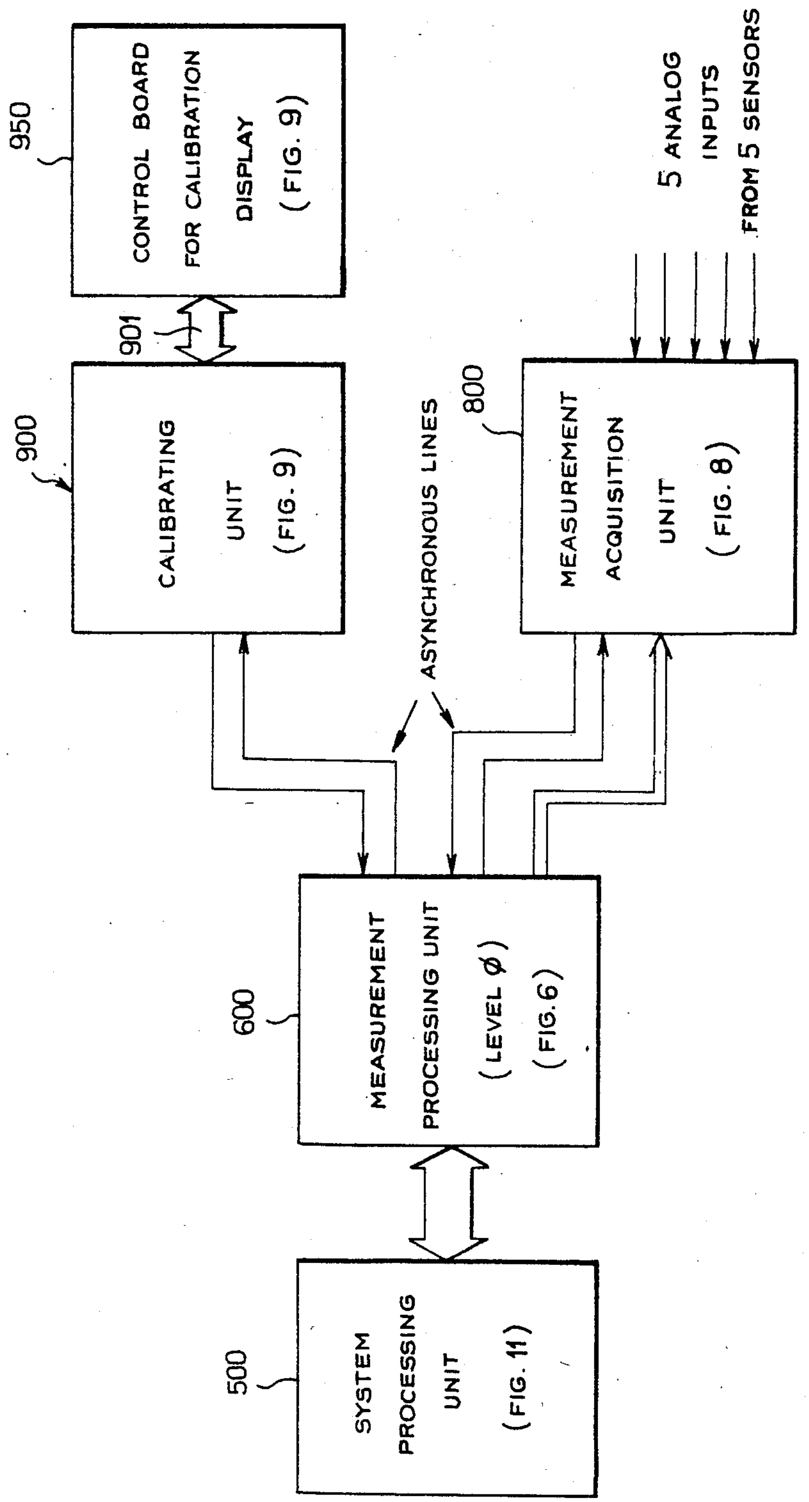
FIG. 5 is a block diagram illustrated the electronic system of this invention and illustrating the interconnections between the details shown in the remaining drawing figures.

In addition, logic control elements, shown generally at 500 and 600 in FIG. 5, are provided with their complementary units 800, 900, and 950.

GENERAL OPERATION

As mentioned above, French patent publication Nos. 2,379,335 and 2,459,196 teach how to create empty spaces or gaps in the succession of workpieces leaving the feed unit MA or of one of the work units upstream of the measuring unit MC. The teachings of these French patent publications can be used, according to the present invention, to create gaps in the production line of workpieces upstream of the inspecting unit MC. Assuming that these gaps are created at the feed unit MA, the affected element is the element 511 of FIG. 11 as will be seen below. A simple variant is to completely feed the feed unit MA and stop it, if necessary.

The other operations affect mainly the inspecting unit MC. The following operation consists in inserting at least one short standard-size piece or gage piece and at least one tall standard-size piece or gage in two, preferably consecutive, gaps thus created either manually or automatically in the production line of workpieces.

Thereafter the sensor 1300 of FIG. 4 derives maximum and minimum measurements from these standard gage pieces as reject values. The acquisition of the measurements in question comprises their conveyance to the acquisition unit 800 which will be described below with reference to FIG. 5.

All this takes place in a measuring phase of the manufacturing process.

Subsequently in the production phase, those workpieces whose size does not fall between the minimum and maximum values, are rejected at the output wheel MC14. This rejection is effected logically by the element 513 of FIG. 11 which monitors and operates the inspecting unit MC. Physically, the rejection is carried out at the normal-reject station MC141 of FIG. 3.

To carry out the process described immediately above, two gage pieces of accurate size are used which are positioned in successive seats of the carousel MC12 and which are successively measured, using the parts 1204 and 1206, stirrup 1220 and the target 1225, by the sensor 1300 in a single pass along the production line. This system can be sufficient in certain applications, but it has been observed that fluctuations can appear in the measurements between the different seats of the inspecting carousel MC12. This is particularly true when the value to be measured is transmitted by an apparatus of the type described in FIG. 4 and comprising a measurement device such as the target 1225.

In this case, it is advisable to use a recycling device of the type described in FIG. 3 providing that the number of seats on the measuring carousel MC12 and the number of positions in the cycling loop, in part formed by the wheels MC15–MC17, have no common divisor other than one. For example, the measuring carousel MC12 has eight positions while the recycling loop has thirteen. This recycling loop therefore passes over a portion of every rotary-conveyor wheel MC11, MC12, and MC14–MC17 seen in FIG. 3. Thus, the number of positions in the recycling circuit includes positions on the intake and output wheels MC11 and MC14 as well as on the inspecting wheel MC12 and on the recycling wheels MC15–MC17 between the locations where the measuring gage is picked up and let off.

Under these conditions the logic units 500 and 600 are set up to effect the following operations:

(a) During calibration, they introduce into the production run, a number of gaps which is greater than twice the product of the number of positions along the recycling loop and the number of seats on the working carousel. (In effect, a number of positions equal to this product would be sufficient for one calibration. Since a maximum-size standard piece and a minimum-size standard piece are used each time, it is preferable that the number of gaps be greater than twice the product of the two above-cited numbers.) Thus, the two calibrating gage pieces are placed consecutively in the two first gaps. Thereafter the unit 600 will get, via the elements that cooperate with it, the maximum and minimum dimensions of the two calibrating gage pieces as well as the reject values for each seat of the measurement carousel, each calibration piece changing position after having passed through the recycling loop. (This requires that the two numbers have no common divisor other than one.) Finally the calibrating pieces are manually or automatically removed, for example at the special-reject station MC142.

(b) Subsequently the electronic control system orders, at the output wheel, the rejection of workpieces whose size does not lie between the minimum and maximum reject sizes which were determined for the particular seat carrying the workpieces.

According to another preferred form of this invention, there are several pairs of calibrating gage pieces which are, respectively, maximum and minimum in each pair so that a pair of calibrating pieces corresponds, for example, to one value to measure.

ELECTRONIC ELEMENTS—DETAILED DESCRIPTION

A detailed description of the electronic system is now given with reference to FIG. 5.

This system has, first of all, an exploiting logic system or processing logic arrangement, indicated generally at 500 and which will be described more in detail below with reference to FIG. 11. (In this FIG. 11 the elements of the device 500 are found inside the dot-dash box.)

The system comprises a numerical encoder connected to one or several incremental coders indicated generally at CO, and having the function of determining the machine position, allowing the detection of the presence of the workpieces in several locations in the installation so that the electronics can, at any moment, know the position of the workpieces in the production path.

In a particular embodiment, each encoder block has three outputs. The first delivers an index signal with each revolution of the respective carousel. The second delivers 180 pulses for each position of the carousel, counting forward. The third does the same as the second but counting backward.

In addition, associated with each of the units is a first (Level I) logic arrangement. For example, the feed unit MA is associated with a level I logic element 511 and the working unit MT is associated with a level I logic element 513. Similarly, FIG. 11 shows how all the calibration operations are controlled by a unit 600 interacting with the inspecting unit MC. The unit 600 reports the operations that it does directly to the level I logic element 513 connected to the inspecting unit MC.

The different blocks 510 to 513 interact through 8-bit parallel connections with a second (Level II) logic arrangement 520. This is preferably associated with an asynchronous command station 521 of the installation, which is described in detail herein.

The second logic arrangement 520 is optionally associated with a third (Level III) logic arrangement 530 which can have the job, for example, of inspecting, not only the portion of the manufacturing installation that is described here, but also the entire installation dealing with the same product. To this end, the third logic arrangement is connected to the second logic arrangement by the series asynchronous connections shown in FIG. 11. For example, assuming that the manufacturing installation described serves to cut castings, other manufacturing installations downstream can carry out subsequent operations of continuous stamping as well as of compressing and reducing the casings to the desired caliber. This third logic arrangement 530 thus generally oversees operations which are not described in detail, as they fall outside the scope of the invention.

Figure 6:
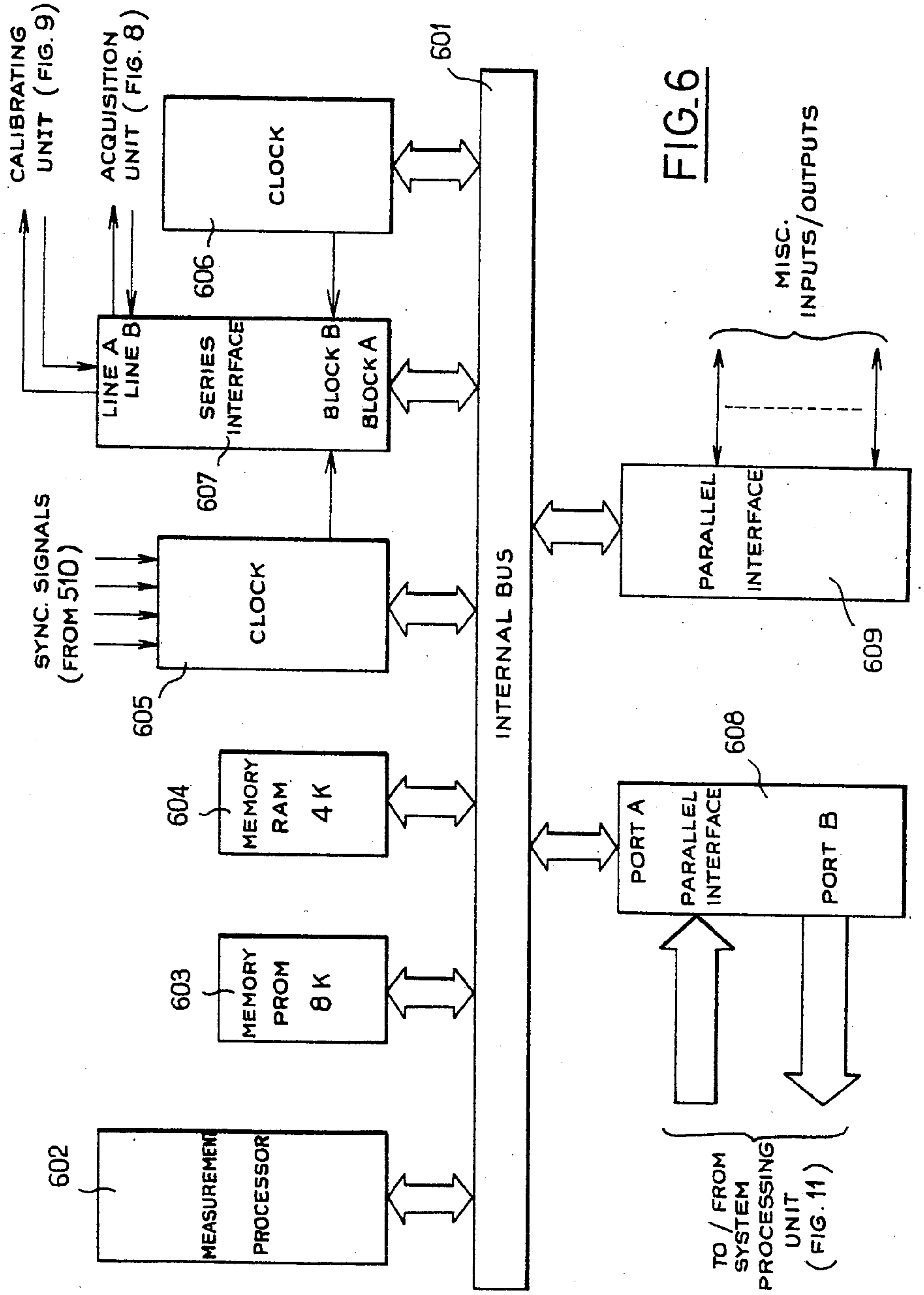
FIG. 6 is a more detailed schematic diagram of a detail of FIG. 5.

Returning to FIG. 5, the processing unit 500 is connected, generally by its level I logic element 513, with the unit 600 shown in more detail in FIG. 6. This unit 600 forms a logical level O logic unit. The unit 600 is connected by asynchronous lines with a measurement-acquisition unit 800 described in more detail with reference to FIG. 8. Synchronization signals are similarly transmittted by the level $\phi$ unit 600 to the acquisition unit 800 which also receives analog inputs of measurement signals (for example five analog inputs for five sensors with at least five sizes to measure, although the same sensor could make different measurements).

Finally the level $\phi$ unit 600 is connected, also by asynchronous lines, to a calibrating unit 900 which controls the calibration and associated operations. The unit 900 is connected by the bus 901 to the calibration control board and display unit 950. The units 900 and 950 are illustrated in more detail in FIG. 9.

DETAILED DESCRIPTION OF THE UNIT 600 (LEVEL $\phi$)

FIG. 6 shows in detail the structure of the level $\phi$ unit 600. It comprises an internal bus 601 to which is connected a measurement processor 602 as well as memories 603 and 604. The memory 603 is a programmable read-only memory of 8 kilobytes, for example, whereas the memory 604 is a 4-kilobyte random-access memory.

The bus 601 is also connected to a parallel interface 608 having a port A and a port B, respectively, dealing with data arriving from and going out to the exploitation system or processing logic arrangement 500.

Another parallel interface 609 is optionally provided for 16 input/outputs usable for functions definable by the user.

Above and to the right in FIG. 6, there are also provided a series interface 607 as well as two counters or clocks 605 and 606. The series interface 607 communicates with the bus 601 and has two sets of outputs, respectively, line A which goes to the calibration unit 900 of FIG. 9 and line B which goes to the acquisition unit 800 of FIG. 8. The clock for the line A is defined by the counter 605 which receives synchronization signals coming from the encoder 510. The clock for the line B is defined by the real-time counter 606 which is only connected to the series interface 607.

Thus the level $\phi$ unit 600 of FIG. 6 can receive all the raw measuring information coming from the acquisition unit 800 as well as interact with the calibration unit 900 and the attached calibration-command unit 950. This unit 600 of FIG. 6 thus sets up the calibration and then processes the real values made on the products in process of manufacture.

Figure 11:
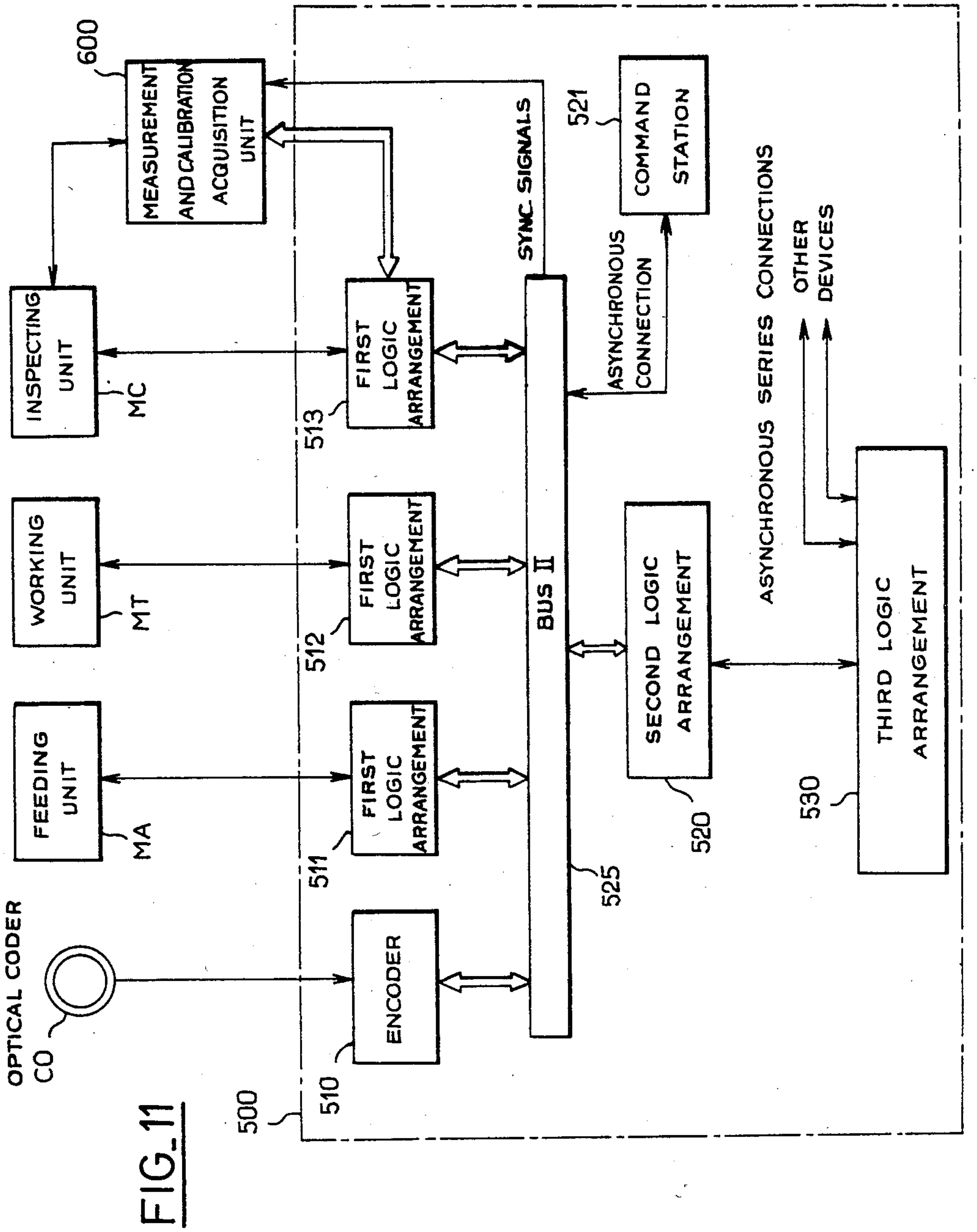
FIG. 11 is a detailed schematic view of yet another detail of FIG. 5.

The parallel interface 608 allows two-way communication between the measurement processing unit 600 of FIG. 6 and the processing logic arrangement 500 of FIGS. 5 and 11 so that the processing logic arrangement 500 rejects those workpieces which do not fall within the acceptable range, this b means of the level I logic element 513 which is directly connected to the measurement processing unit 600.

ACQUISITION UNIT 800

Figure 7:
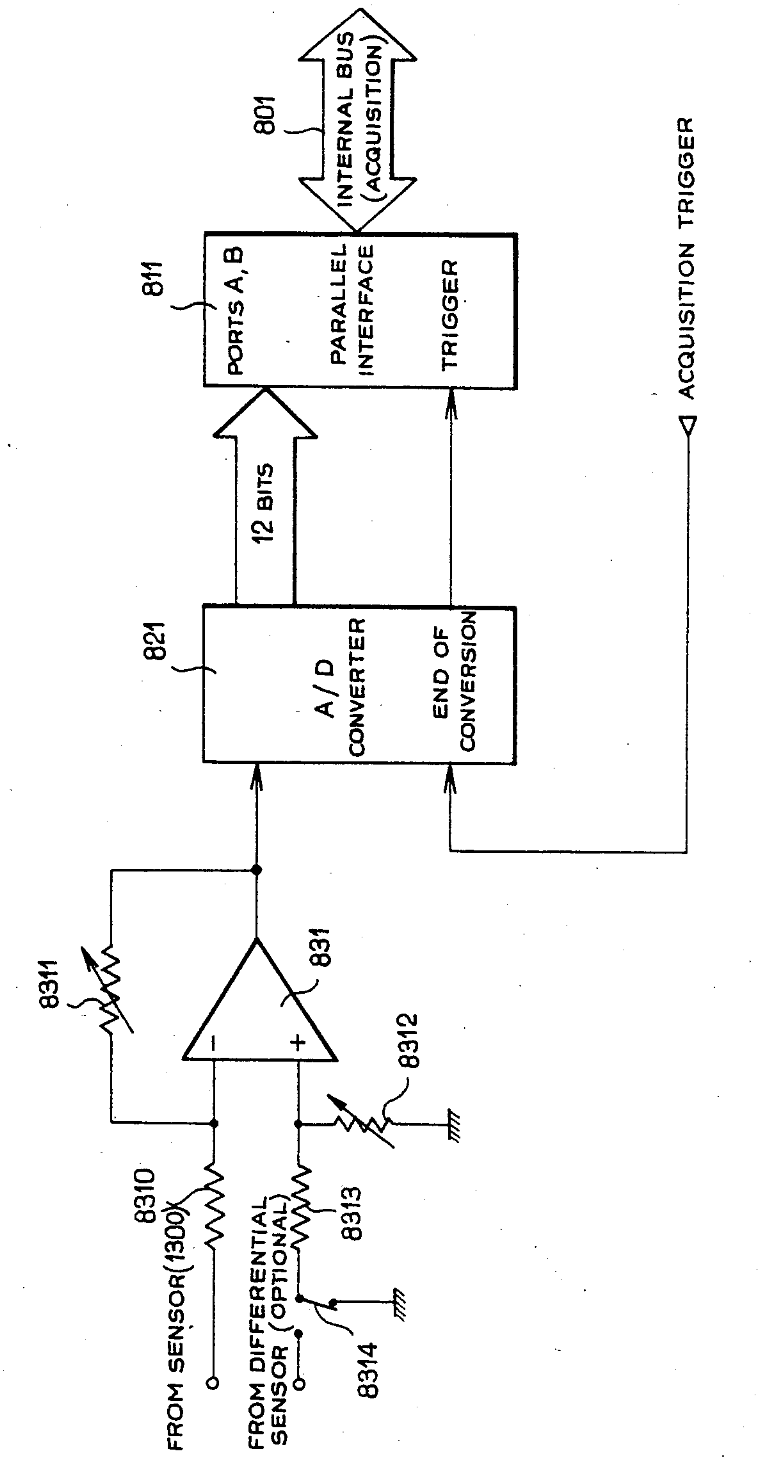
FIGS. 7 and 8 are detailed schematic views of further details of FIG. 5.
Figure 8:
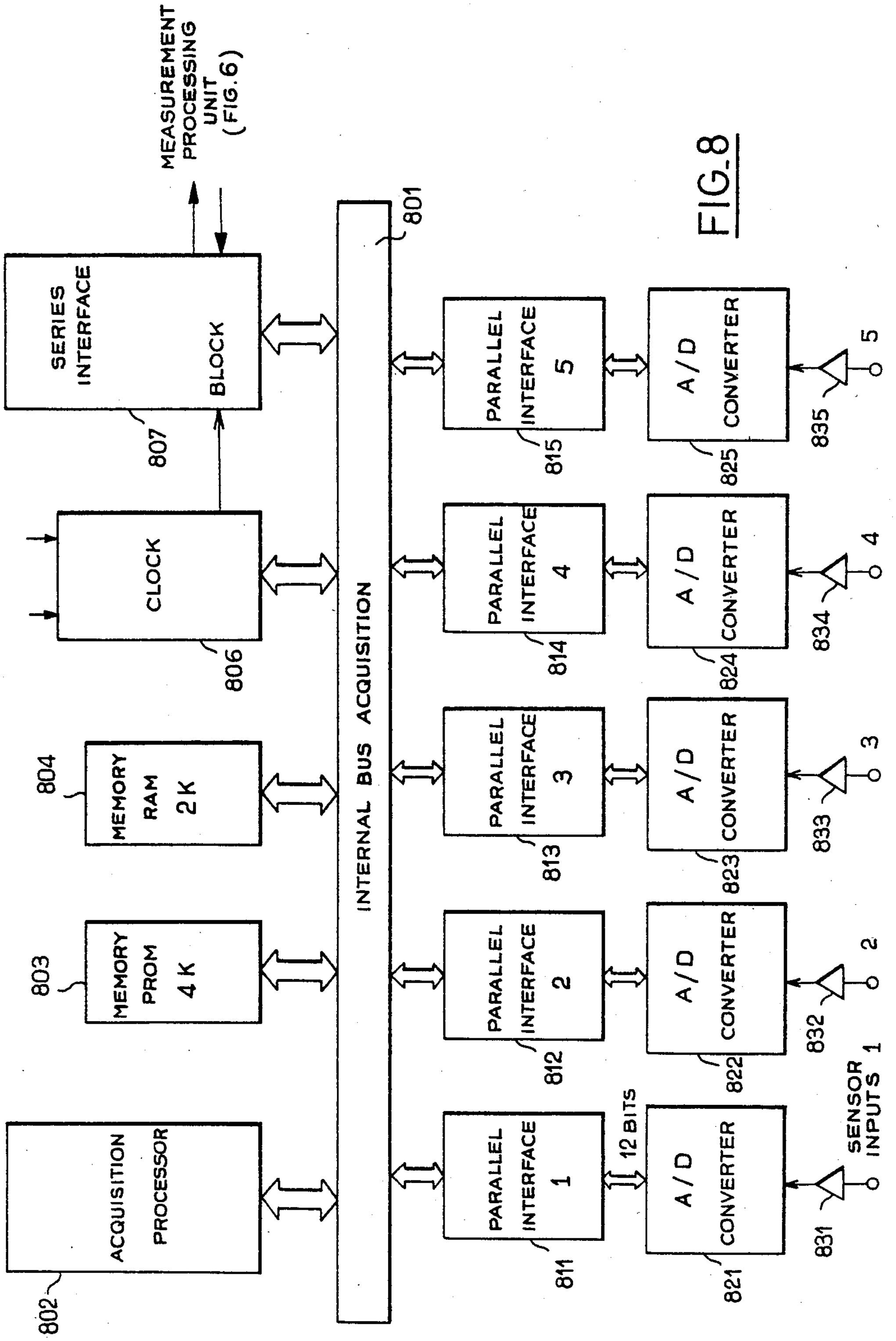

FIGS. 7 and 8 show the acquisition of the information at the sensors.

In FIG. 7 at the top, a line coming from the sensor 1300, or more correctly the signal conditioner that is connected to it, leads through a resistor 8310 at the inverting input of a differential amplifier 831. This inverting input is also connected to the output via an adjustable resistor 8311.

The noninverting input of the same amplifier 831 is connected on one side to ground via an adjustable resistor 8312 and on the other side to a resistor 8313 which goes to a switch 8314.

When a measurement only involves a single sensor, the switch 8314 is in the illustrated position, connecting the noninverting input of the amplifier 831 to ground. When, on the other hand, a measurement takes two differentially working sensors, the second sensor is then connected to the input shown at the lower left in FIG. 7, and the switch 8314 is in the other position.

In both cases, the measurement information of the sensors is at the output of the amplifier 831. This information is conducted to the analog input of an analog/-digital converter 821 which receives the order to start acquisition from an acquisition processor 802 via an internal bus 801 (not shown in FIG. 8). When the sampling is converted into digital form, the end of the conversion is signaled to a parallel interface 811 by the output at the lower right corner of the converter 821. The interface 811 thus gets the 12 bits of the conversion on the parallel outputs of the converter 821 to transmit them via the acquisition bus 801 (raw measurement data in internal units).

This arrangement is shown generally in FIG. 8 for five sensors. It is noted that these five sensors can make more than five measurements by each cooperating with several targets at the same measurement station, making the measurements in a rapid sequence. This is particularly advantageous, in particular in view of the place taken by the support of each sensor (FIG. 4).

There are five differential amplifiers 831–835 for the five sensors, followed by five analog-to-digital converters 821–825, then five parallel interfaces 811–815. All the parallel interfaces communicate with the internal acquisition bus 801.

The acquisition processor 802 is seen at the top of FIG. 8. It is associated with two memories 803 and 804, the former being a programmable read-only memory of 4 kilobytes and the latter a random-access memory of 2 kilobytes. The internal memory-acquisition bus 801 is also connected to a counter or clock 806 which receives synchronization signals from the encoder device 510. This clock 806 creates clock signals for the series interface 807 which can transmit the measurement values to the unit 600 of FIG. 6.

Thus all the measurement-acquisition operations are done by the elements illustrated in FIG. 8.

CALIBRATING UNIT 900 AND CONTROL BOARD 950

Figure 9:
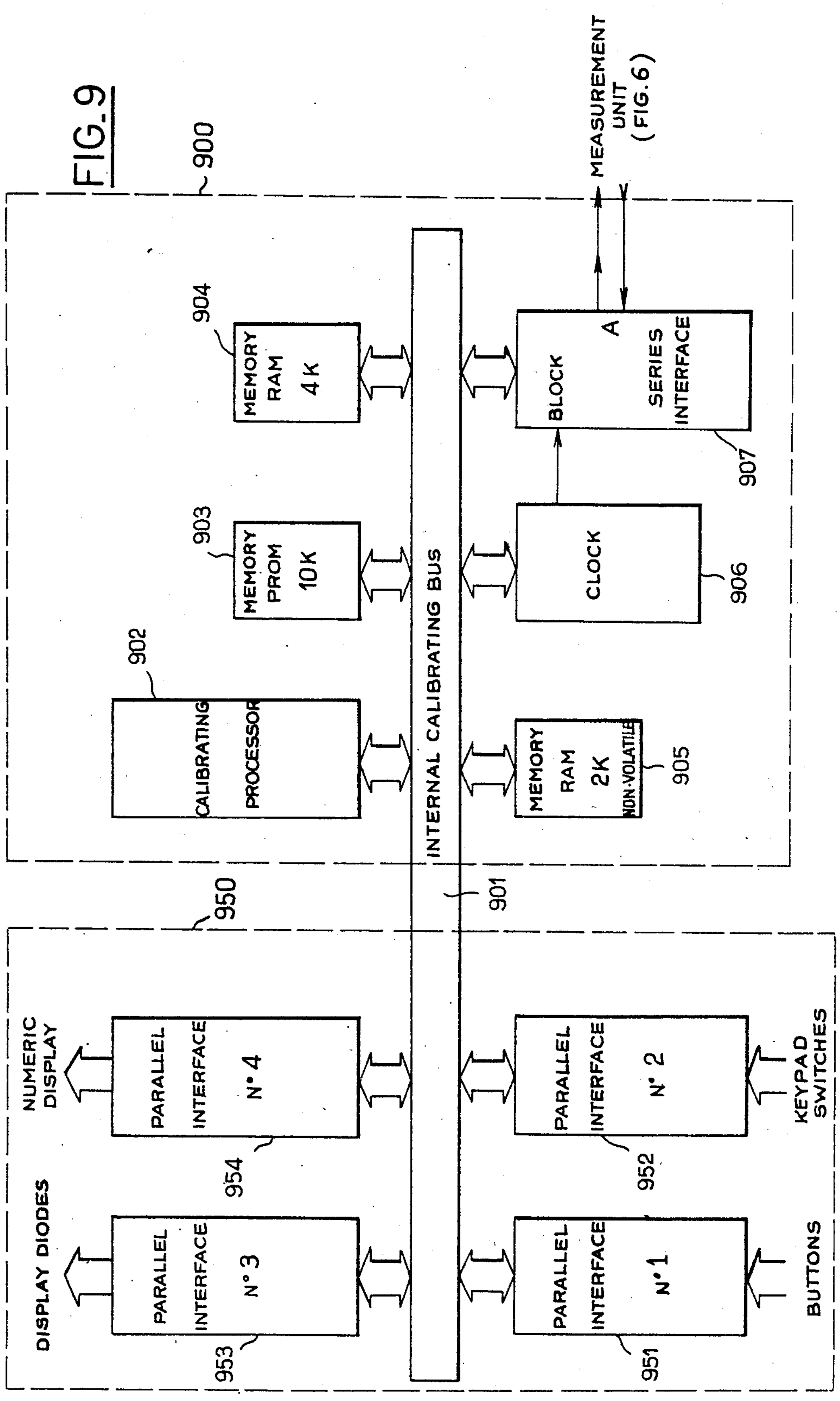
FIG. 9 is a detailed schematic view of other details of FIG. 5.

FIG. 9 shows the two calibrating units formed by a central unit and a control board.

The internal calibration bus 901 is connected (toward the right in the unit 900) to a calibration processor 902 having three memories 903, 904, and 905. The memory 903 is a programmable read-only memory of 10 kilobytes. The memory 904 is a random-access memory of 4 kilobytes. Finally the memory 905 is a nonvolatile random-access memory of 2 kilobytes, that is, it retains its data even when the machine is shut down. This memory 905 is useful for storing the calibration limits even when the system is out of service.

The internal bus 901 is connected (to the right) to a clock 906 which emits clock pulses for a series interface 907 which is connected between the internal calibration bus 901 and the measurement unit 600 of FIG. 6.

To the left in FIG. 9, the connections with the control board comprise four parallel interfaces 951–954 which respectively form connections with the elements of the control board.

Figure 10:
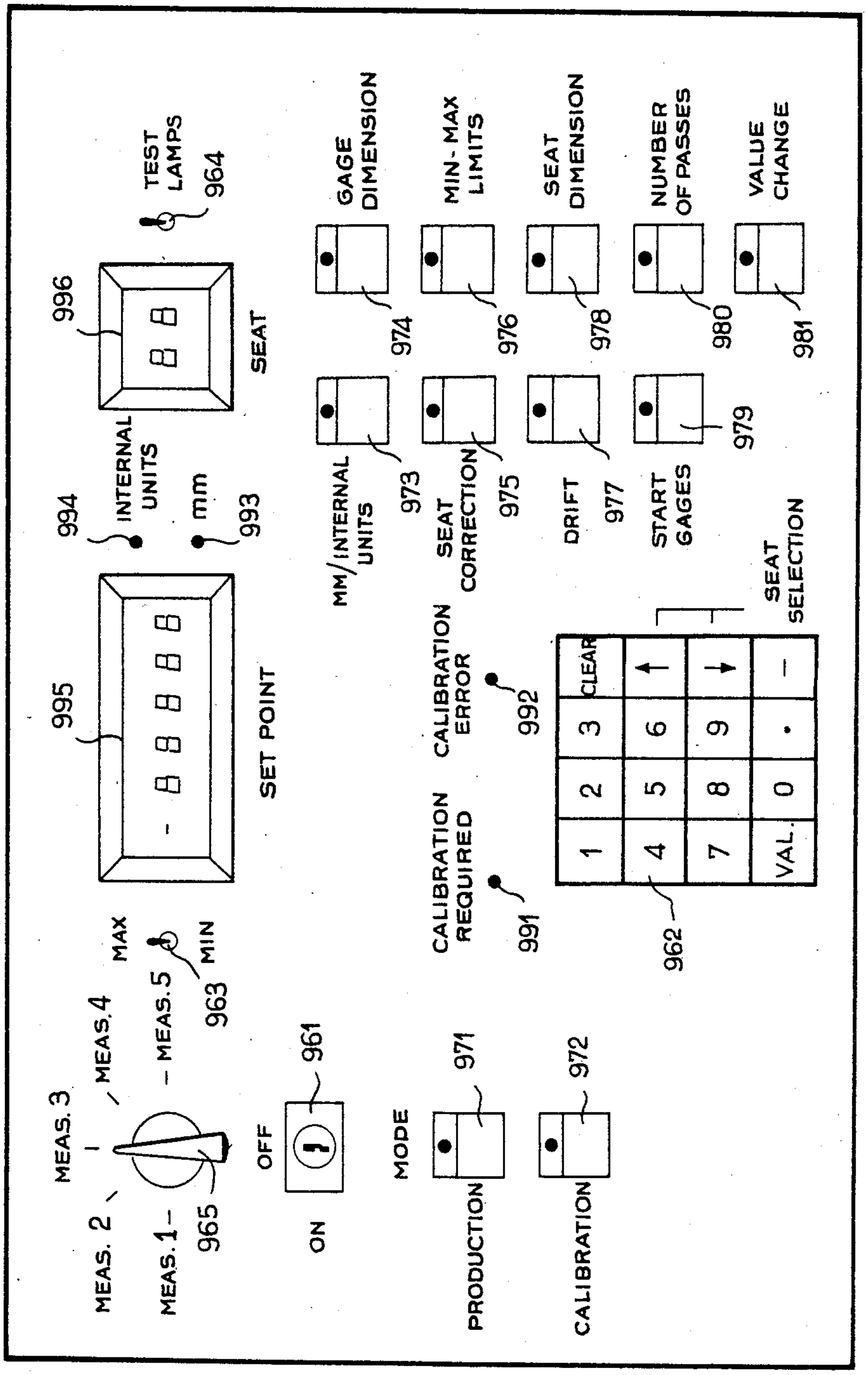
FIG. 10 is a front view of a detail of FIG. 5, in this case the control board for the system.

Before examining these connections, reference will be made to the control panel shown in FIG. 10.

This panel has buttons 971 to 978 depressible to display certain information about the state of operation of the installation as described in more detail below. Each button has a lamp which indicates if the respective condition is met or not. All these buttons are controlled by means of the parallel interface 951.

The control board 950 also has a keypad as well as switches 961, 963, 964, and 965. The keypad and these switches are connected to the parallel interface 952 of FIG. 9.

The indicator diodes associate with the buttons as well as the other diodes 991–994 and are controlled by means of the parallel interface 953 of FIG. 9.

Finally the control board has a display 995 for the measurements to be displayed as well as a smaller display 996 that indicates the number of the seat whose measurements are being displayed. These two numeric displays are controlled by means of the parallel interface 954 of FIG. 9.

CONTROL OF THE BOARD 950

As indicated above, two modes of operation are possible: production (button 971) and calibration (button 972). The key switch 961 is for calibration. When off, calibration and any modification of the values set therein is impossible. When on, it allows calibration. If, during a calibration, the key switch 961 is returned to the off position, the calibration operation is stopped instantly.

The rotary measurement selector 965 selects the dimension to be measured from among those provided, here a maximum of five. This selector 965 is associated with the buttons 979 (gage-piece start), 976 (max/min limit), 978 (seat measurement), 977 (drift), 975 (seat correction), and 974 (gage-piece measurement).

Which data is displayed, is controlled by the switch 963 which allows either minimum or maximum values to be displayed, as well as by a button 981 which allows modification of the value.

Table I given below illustrates at "YES" the permissible combined actions and at "NO" the impermissible combinations of different buttons, both during calibration and production:

The following is the use of the other keys. The key 973 serves for conversion between millimeters and the internal units, that is the raw digital values obtained by conversion of the output voltages of the sensor conditioners. In production this switch has no function, since it is associated with the adjustment controls (not shown and serving for maintenance).

The value-change key 981 allows one to start entering a new value on the keypad 962. The clear key CL erases the last number entered. The validation key VAL of the keypad is pressed to enter the number from the electronic circuits, in which case the clear key does not work.

The seat-selection keys bearing upright arrows of the pad 962 allow the seat number to be increased or decreased, working with the display keys illustrated in Table I above.

The switch 963 works with the keys 974 (gage dimension), 976 (max/min limit), 979 (gage start), and 977 (drift).

Finally, the switch 964 allows one to light all the diodes of the control board. If one does not light, the operator can replace it. The key bearing the negative sign is used to modify corrections.

Figure 12:
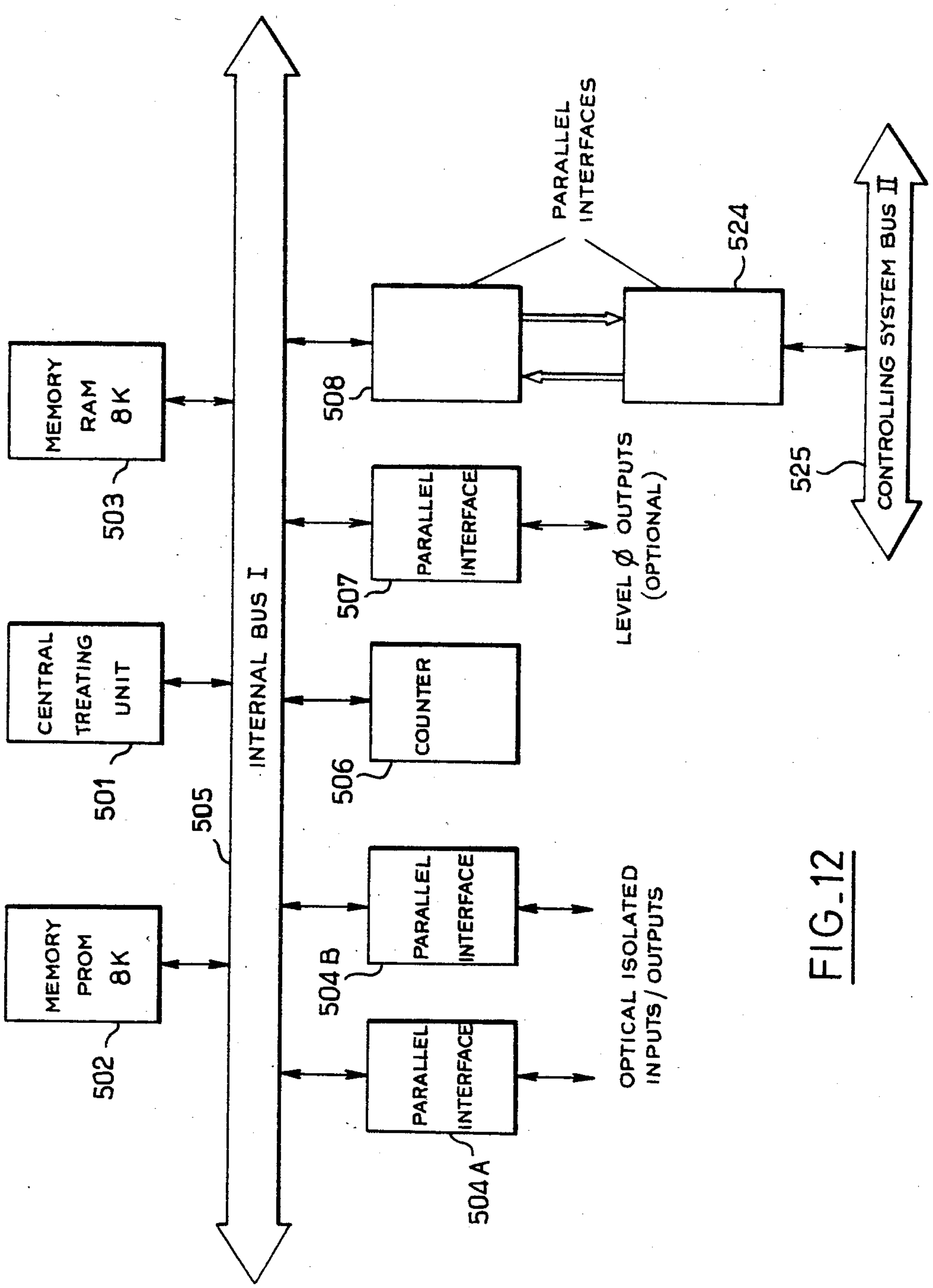
FIG. 12 is block diagram of one of the logic elements of the first logic arrangement of FIG. 11.

FIG. 12 illustrates, by way of example, the block diagram of one of the level I logic elements which have been designated 511, 512 and 513 in FIG. 11.

Each element includes, around an internal bus 505, a central treating unit 501 and memories 502 and 503 (RAM, 8 kilooctets) (9PROM, 8 kilooctets). To this bus 505 there are also joined parallel interfaces 504A and 504B (additionally optional parallel interface 507), which go, across an optically isolated coupling, towards the corresponding module. In addition, there is provided a time-counter 506, and a parallel interface such as 508 which is in communication, via a homologous interface such as 524, with the level II controlling system bus 525. (For material saving reasons, the interface 524 is imprinted on the same card as the associated interface 508 of level I).

Figure 13:
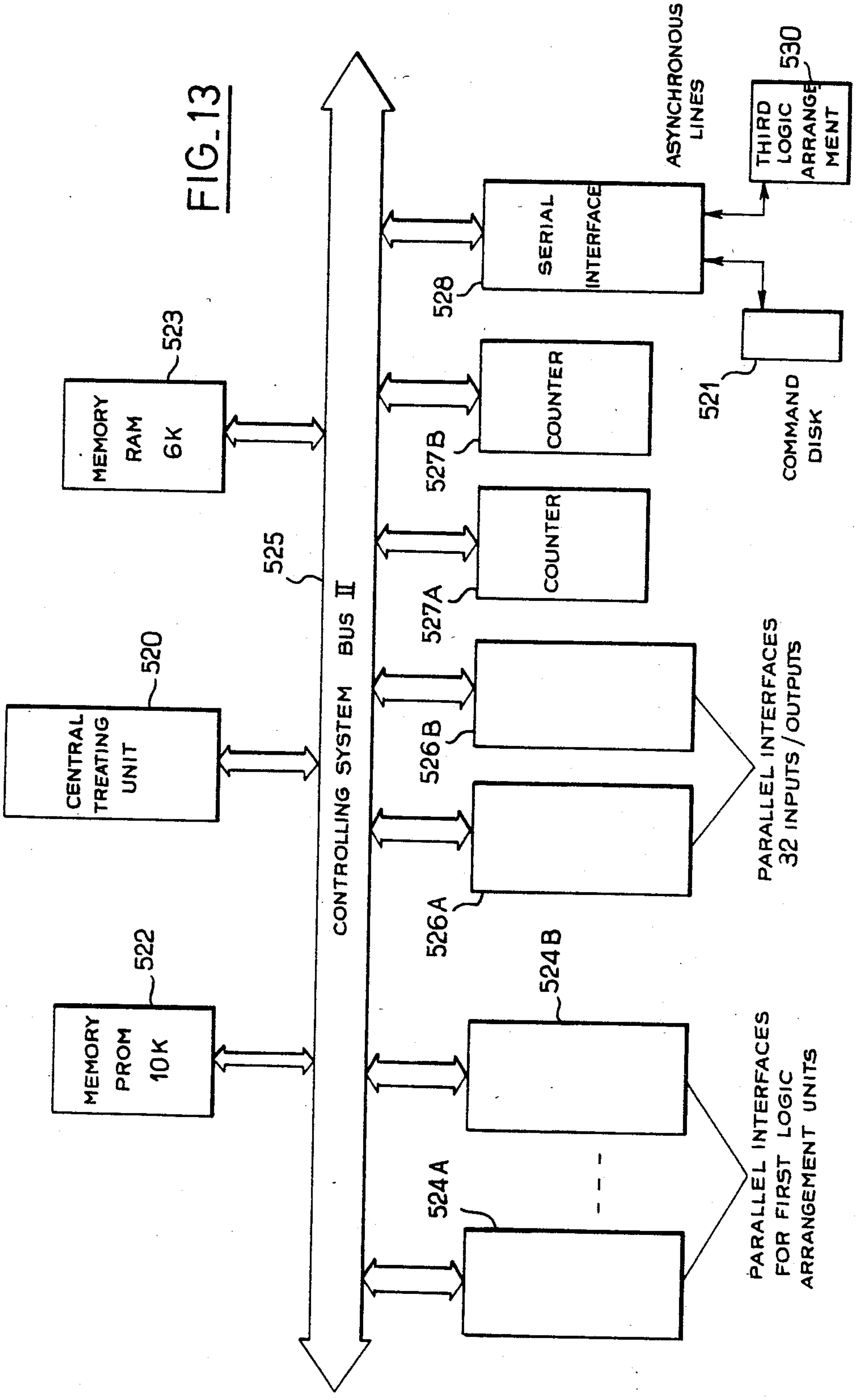
FIG. 13 is a block diagram of the second logic arrangement of FIG. 11.

FIG. 13 illustrates schematically level II. One finds here the bus 525 and interfaces 524, 524B etc. associated with different corresponding units in level I. The heart of the level II is a central treating unit 520 which is associated with a program memory 522 (PROM, 10 kilooctets) and a working memory 523 (9RAM 6 kilooctets). There are also provided two time counters 527A and 527B, as well as, preferably, two supplemental parallel interfaces 526A and 526B.

Finally, and above all, the bus 525 is joined, across a serial interface 528 by asynchronous lines, on the one hand to a command disk 521 and on the other hand, to a third logic arrangement 530.

The third logic arrangement 530 is composed preferably of a mini-ordinator, such as an ECLIPSE calculator S 140 of General Data, comprising:

a memory capacity of 192 kilowords of 16 bits, a disk unit: 12,5 megaoctets fixed or affixed disk and a movable cartridge of 2×5 megaoctets.

This allows the running of up to two modular chains, each having ten modules.

DESCRIPTION OF THE PREFERRED EMBODIMENT

Hereinafter there follows a description in which the units 900 and 950 of FIG. 5 have been denoted as "calibration". The unit 800 has been denoted as "acquisition". The measurement processing unit 600 has been denoted as "level $\phi$". Lastly, the elements 511 to 513 of FIG. 11 have been denoted generally as "level I".

In brief, the electronic circuitry of level $\phi$ receives, as long as the machine progresses stepwise, the measuring result realized by the acquisition, which carries a block of five data in internal units, which data represent the value of the sizes of the present workpiece. To these sizes one can add one or two corrections which are the sizes, in internal units, of the fixed targets. For certain positions of the machine, these values may be absent because it is not always necessary to provide two fixed targets for each seat.

Summarizing, in the calibration phase, the communications between the level $\phi$ and the calibration unit consists in transmitting to the calibration unit and raw data which emanates from the acquisition unit. In this case the level $\phi$ of the electronic circuitry can also transmit to level I the raw data, in internal units, since the correction of the conversion coefficient hereinbefore mentioned are not yet known.

In the production phase, the level $\phi$ has essentially, for utility function, the synchronization signals, in particular those which emanate from the encoding unit 510 in FIG. 11, for including, with each one of the five data emanating from the acquisition unit, the number of the seat on which the measurement took place, and the identity of the corresponding workpiece. With respect to the values of the fixed target, the level $\phi$ calculates a sliding average on the sixteen last values (for example). These five raw data measurements and the sliding average have not been corrected and are in internal units and are now transmitted to the calibration unit.

Repeatedly, at each rotation of the carousel in the production mode, the calibration unit communicates the new coefficient of conversion so that the variations and drifts of the machine are taken into account.

In the production mode, the level 0 unit knows then the converted values in microns, and can proceed to sort, by means of the sizes of the reject in microns, to calibrate or to start production. The validity of the sizes is verified by simple comparison with two limit values. All this converted data is transferred in microns to level I, affected by an indicator giving the results of the control of the sizes, to no good, here to maximum, or there to minimum.

In view of the fact that the decision to reject a workpiece may be executed in the level $\phi$, which is near the acquisition (800) and the calibration (900), the structure which is illustrated in FIG. 11 proceeds differently: there exists a level I for each of the units of the machine, that is for the inspecting unit, as well as for the working unit and the feeding unit. In these conditions, the information which just have been indicated are utilized in fact for the level I unit 513 for effecting the ejection of the workpiece if a rejection is necessary. This ejection can, for example, be effected at the normal reject station MC141 in FIG. 3.

Men skilled in the art will understand now that the dispositions hereinabove described enable an installation which is capable of high speed operation with a control that is extremely reliable relative to the precision of use effected. This is important in numerous technical domains, and in particular for the production of cartridge casings. One can note that the operator only needs to intervene during the calibration phase. Once this has been effected, the production can run normally without any human intervention. The units and arrangements hereinabove described clearly show that in case of a malfunction in production, the machine can stop itself, and ask the operator to intervene which can, for example, be for a new calibration operation.

Additionally and complementary, the arrangements of the present invention permit a physical control of the elements in production. To this end, one can, in particular, verify the functioning of the control module by introducing one or a plurality of workpiece standards at the station MC110 of FIG. 3, and by inserting the sizes of the standards in a convenient manner and with the aid of the keypad 962. The standards need not have to pass through the recycling loop, but rather may be re-exitted by the special reject station MC142.

Similarily, it is possible to pre-elevate to the same level special reject MC142 workpieces, of which one knows the values measured by the machine, values that one can control by measures effected manually and any other manner.

One will now be interested, by way of example, in a particular case of production of ammunition which may make intervening, in the same production chain, of the following units, keeping in mind a numerical identification in hexadecimal.

| Designation of the unit | Numerical Identification (Hexadecimal) |
|---|---|
| Feeder | 01 |
| feeder cups | OD |
| drawing | 02 |
| second drawing | 03 |
| intermediate cart | 04 |
| final cart | 0B |
| Indentation | 05 |
| | 06 |

-continued

| Designation of the unit | Numerical Identification (Hexadecimal) |
|---|---|
| Turning | 07 |
| Stamping | 08 |
| First shrink I | 09 |
| Shrink | OA |
| Annealed | OC |
| claiming unit | OE |
| Inspection | 10 |
| Inspection | 11 |
| Inspection | 13 |
| Inspection | 18 |
| Inspection | 12 |
| Inspection | 17 |
| Inspection | 14 |
| Inspection | 16 |
| Inspection | 15 |
| Aspect inspection | 19 |
| powdered charge/ball setting | 1A |
| Welding | 1B |
| lacquering | 1C |

The feed units and working units may create rejects of pieces by themselves (incorrect position of a piece, for example) however, most of the rejects occur on an inspecting unit, as previously described.

All of the corresponding information passes through the level II or levels II, or are placed in a form for being centralized through the level III. The exchanges in level II and level III are effected by the asynchronous lines in full duplex, at a speed of 9600 bits per second, and on a format of 11 bits: 1 bit start, 8 bits data, 2 bits stop.

Figure 14:
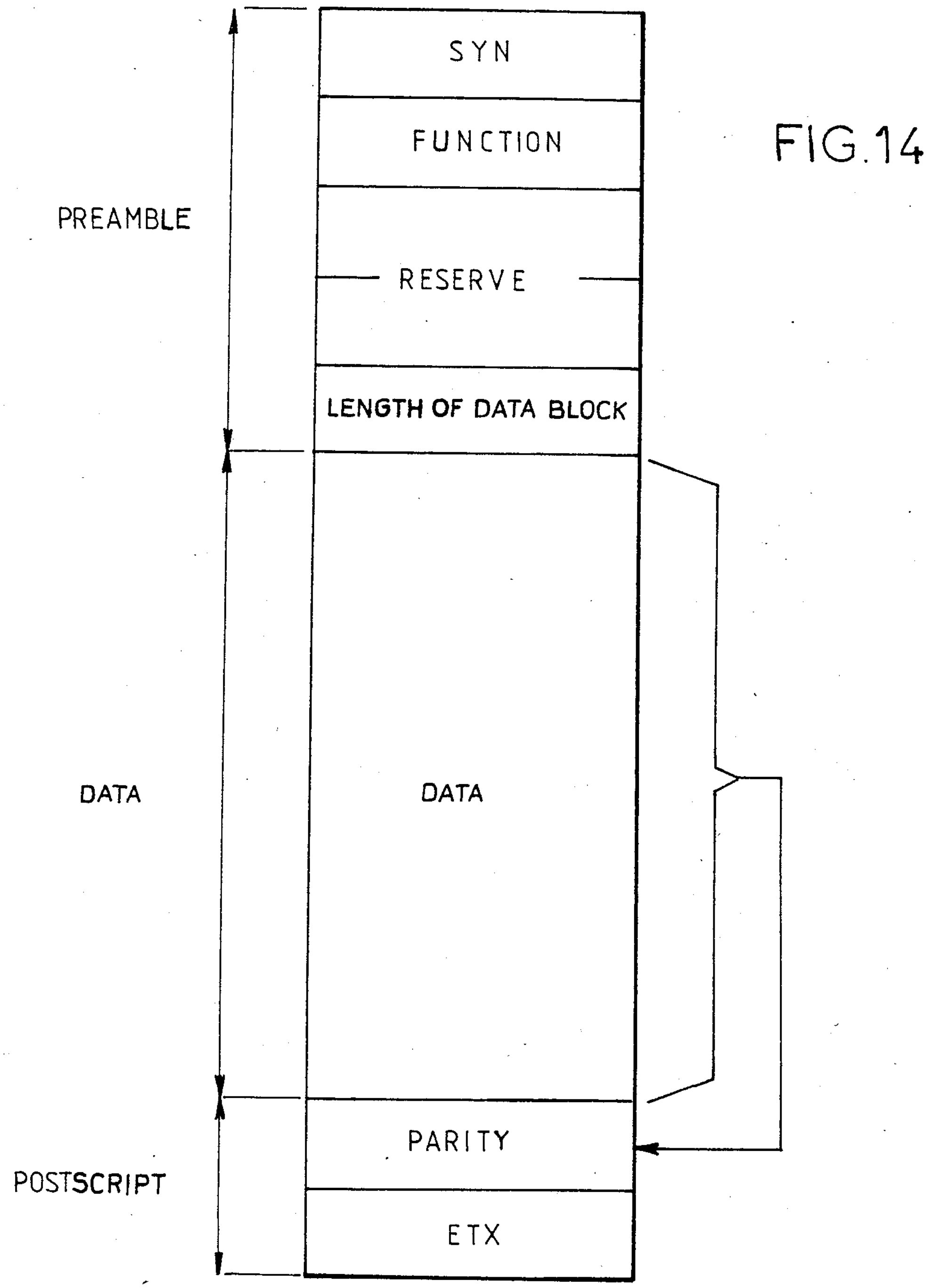
FIG. 14 is a diagram of the data format for exchange between level II and level III.

As is seen in FIG. 14, all exchange is constituted by an assembly of 3 blocks:

| | |
|---|---|
| Preamble: Octet 1: | SYN (16H) |
| 2: | Function |
| 3-4: | Reserve |
| 5: | Length of the data block |

Data: The length and nature of the data are random (defined by the octets 2 and 5 of the preamble)

Postscript: Octet 1: Parity of the data, calculated only on the octets of the data by means of an Exclusive-OR Function between all of the multiples.

Octet 2: ETX (03H) Some types of data are exchanged in this manner: the most important (the type of word NDE) concerns the data "product".

In this case, the octet "function" is 4, and the sense of transmission goes from level II to level III.

One block of this type is emitted by the level II each time the machine progresses one position. The data describes the state of the starting seat, which may be empty or loaded with a workpiece.

The block is constituted by two distinct parts: one fixed part, of which the structure does not depend on the machine and a varying part describing the workpiece.

Fixed part:

| | 7 | 0 |
|---|---|---|
| | CP MT RN RS | IDK IP IC — |
| 2 | MOD10 | MOD 8 |
| 3 | | MOD 8 TO |
| 4 | Rejecting | Ident. Module |
| | Station | |
| 5 | Ground of Rejection | |

CP: Starting seat furnished with a workpiece.

-continued

| | |
|---|---|
| MT: | The seat has never been occupied (no feed). |
| RN: | The workpiece has been ejected by the normal-reject station. |
| RS: | The seat is emptied by insertion of a standard or by sampling (stop-checking). |
| IDK: | \ Internal use at level II / |
| IP: | |
| IC: | Insertion request |
| MOD 10: | Number of working unit 10 where the workpiece is passed. |
| MOD 8: | Number of inspecting unit 8 (after stocking, if it has taken place). |
| MOD 8 TO: | Inspecting unit 8 initial (before stocking). |
| Rejection Station: | (3 bits of heavy weight). Internal use. |
| INDENTIFICATION MODULE: | (5 BITS) Number of unit where the ejection has taken place (see above). |
| REASON FOR REJECTION: | Position by the fact which has provoked the rejection. |

The format of the reason for rejection is as follows:

Examples of the rejection code are given hereinbelow:

| | | | | |
|---|---|---|---|---|
| General Rejection: | | | | |
| 0 | 0 | 0 | 1 | Invered casing |
| 0 | 0 | 0 | 2 | Casing of undetermined position |
| 0 | 0 | 0 | 3 | Casing which is too short |
| 0 | 0 | 0 | 4 | Casing which has been badly overdone |
| 0 | 0 | 0 | 5 | Absence of matrix |
| 0 | 0 | 0 | 6 | Lack of prime housing |
| 0 | 0 | 0 | 7 | Lack of extruction throat |
| 0 | 0 | 0 | 8 | Inverse cup |

| | | | | | | | | |
|---|---|---|---|---|---|---|---|---|
| Rejection for Inspection | | | | | | | | |
| 0 | 0 | 0 | X | X | X | X | X | Casing of minimum measure X |
| 0 | 1 | 1 | x | x | x | x | x | Casing of maximum measure X (or rejection for the sizes not stabilized) |

| | | |
|---|---|---|
| Rejection for Sampling | | |
| 1 0 0 X X X X X | Sampling for casing | bad |
| 0 1 0 X X X X X | | good |
| 1 1 0 special code | | special |
| 1 1 0 0 0 0 0 0 | | random |

Examples of the measuring codes (identified above by X's) are given hereinbelow:

1. Lengths between supports
2. Diameter
3. Total Length
4. Diameter flanging
5. Thickness of flanging
6. Diameter of throat
7. Height of anvil
8. Depth of primer housing
9. Maximum diameter of primer housing
10. Total form
11. control gap of staleness 12. Aspect inspection
13. Internal structural control of the collar.

The variable part of the data depends on the type of machine, but not on the state of the seat. (It exists even when there is no workpiece).

It is constituted by the continuation of the sizes and the diagnostics effected by the machine.

The structure of a data "side" is as follows:

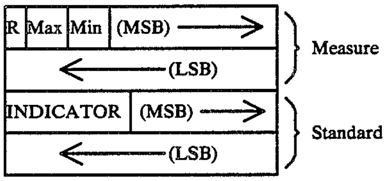

In absence of measure—R Max Min = 1 1 1 In standard mode—R Max Min = 0 0 1

R: Indicator of good or bad side. One bad side causes a rejection.

Max: Upper size at maximum limit.

Min: Lower size at minimum limit.

MEASURE: Data 13 bits signed in complements of 2. this data translates the variation of this size relative to the middle of the range of tolerance.

Standard: Data 13 bits concerning standard of measuring system. The significance of the data depends on the value of the

INDICATOR:

| INDICATOR: | | |
|---|---|---|
| ∅ | Size fixed target min. | |
| 1 | Derived size of fixed target min. | |
| 2 | Slope, heavy weight | |
| 3 | Slope, weak weight | A reel = (has received)/$(2^{+19})$ |
| 4 | Size, fixed target max. | |
| 5 | Derived, fixed target max. | |
| 6 | Abscissa at the origin high part | |
| | | B reel : B received |
| 7 | Abscissa at origin low part | |

The same structure permits, in a little form, to transmit two coefficients A (slope) and B (abscissa at the origin) established as of the standardization of the recoverers of measure.

Format of the coefficient A and B

| COEFFICIENT A 24 SIGNIFICANT BITS (A reel - A received/$2^{+19}$) | | | | | | | | |
|---|---|---|---|---|---|---|---|---|
| Part high | T D20 | A D19 | C D18 | / D17 | / D16 | D23 D15 | D22 D14 | D21 D13 |
| Part low | T D7 | A D6 | C D5 | D12 D4 | D11 D3 | D10 D2 | D9 D1 | D8 D0 |
| **COEFFICIENT B 16 SIGNIFICANT BITS** | | | | | | | | |
| Part high | T / | A / | C / | / / | / / | / D15 | / D14 | / D13 |
| Part low | T D7 | A D6 | C D5 | D12 D4 | D11 D3 | D10 D2 | D9 D1 | D8 D0 |

The level III disposes, in this way, of complete information concerning the operation of the installation:

Other exchanges between the level III and level II may intervene, in particular:

* coming from LEVEL II:
  - event, such as mooring, urgent stop, configuration of the stocking;
  - inhibition of an inspecting unit, (unit 8) or of a working unit (unit 10);
  - request for inspection of a gage piece;
  - results of the measurements on the gage piece inserted;
  - request for sampling;
  - default on unit;
* coming from LEVEL III:
  - Request of inhibition of unit, unit 8 or unit 10, depending on the case;
  - Request for stopping the machine.

We will now describe the statistical utilization of the meaures.

All of the data issued from the level $\phi$ transit through the level I towards the level II which transmits it to the level III for realizing the statistical treatments.

level III receives a block of data from level II each time a machine progresses one seat. The data describes the state of the starting seat which may be empty or full. The complete detail of this block of data has been set forth above.

For all of the receptions, all the sizes are safeguarded by units whether the measurement is good or not. The level III therefore establishes:

unit for unit for each size:
- filtered medium
- variation of the filtered type
- percentage of rejection by motive
- counting of the rejects without distinction of the unit for each size:
- arithmetic mean
- deviation of the arithmetic type.

For practice, the level III calculates the supplying of workpieces, the curbs of use of the tools, particularly. By means of display screens and printing means, it is possible to illustrate and edit, at any moment, the results at the request of the operator.

To this effect, the level III effects the following counting:

$QE_i$: Number of empty seats or full seats having passed through the machine. This number is equivalent to the number N.D.E. (function 4) since there is always a corresponding N.D.E. per seat regardless of its state: empty, undetermined, good or bad.

$QF_i$: Number of workpieces which have effectively exited from the feeder. In this number there are included workpieces inversely fed, but there are no longer any gaps.

Number of N.D.E. with MT = 0
or—MT= 1
and reject by inversion
at the feed.

$QD_i$: Number of workpieces effectively entered into the machine. These are all the workpieces fed at the location. Number of N.D.E. with MT=0

$QS_i$: Number of workpieces effectively exited from the machine. These are all good workpieces. Number of N.D.E. with CP=1

$QR_{ijk}$: Total number of rejects
- on the stop i
- on the unit j
- for motive k This number includes all the rejects possible except the sampling. It is defined by the number of N.D.E. with
RN=1
or RS=1
and motive insertion.

$$QR_i = \sum_{jk} QR_{ijk} \longrightarrow \text{total number of rejections on the stop } i.$$

$QM_i$: Number of total rejects on the inspecting unit.

$$QM_i = \sum_{jk} QR_{ijk} (\text{for } k\text{: default on signal controls}).$$

These are all the N.D.E. where
RN=1 and motive reject for casing max.
or casing min.

$QL_i$: Number of sampling pre-elevated:
These are all the N.D.E. for:

RS = 1
and
motive code of sampling.

$QV_i$: Number of acquired workpieces at the downstream stock by dialog on the machine console.

$QA_1$: Number of added workpieces.

$QI_i$: Downstream stock or intermediate (between two stubs).

One deduces by the equation:

$$QI_i = QS_i + QA_i - QV_i - QD_i + 1$$

level III calculates then the following yields:

| | |
|---|---|
| $RA_i$: Yield of feed | $QF_i/QE_i \times 100$ |
| $RG_i$: Global yield | $QS_i/QE_i \times 100$ |
| $RU_i$: Yield of use | $QS_i/QD_i \times 100$ |
| $RR_i$: Cost of rejects | $QM_i/QD_i \times 100$ |

$QV_i$: Number of acquired workpieces at the downstream stock by dialog on the machine console.

$QA_i$: Number of added workpieces $QI_i$: downstream stock or intermediate (between two stubs). One deduces by the equation:

$$QI_i = QS_i + QA_i - QV_i - QD_i + 1$$

The Level III calculates then the following yields:

| | |
|---|---|
| $RA_i$: Yield of feed | $QF_i/QE_i \times 100$ |
| $RG_i$: Global yield | $QS_i/QE_i \times 100$ |
| $RU_i$: Yield of use | $QS_i/QD_i \times 100$ |
| $RR_i$: Cost of rejects | $QM_i/QD_i \times 100$ |

As indicated hereinabove the level III assures the acquisition and safeguarding after treatment of all of the data that has issued from the machine via the level II. This data is of two types: metrological data and occurrences.

Metrological Data

As long as a machine advances from one seat, the level III receives one block of data in which there are provided all the characteristics of the seat exiting from the machine: number of working units and of inspecting units, value of the measured sizes whether the workpiece is good or not, and in the latter case, the motive for rejection.

All the sizes generated by the machines are stored in memory by the working unit and by the inspecting unit in a manner to permit:

illustration of the 20 last sizes on a given unit the calculation of the mean and the variation of the filtered type the calculation of the mean and the variation of the arithmetic type the actuation of the counters of the workpieces.

The mean and variations of the arithmetic type are calculated for each size, all units being mixed, in order to characterize completely one lot of workpieces.

The calculations are as follows:

arithmetic mean:

$$M = \frac{1}{N} \sum_{i=1}^{N} X_i,\ X_i = \text{sampling}$$

arithmetic variation type:

$$\delta = \sqrt{\frac{\sum_{i=1}^{n} (X_i - M)^2}{N}}$$

In contradistinction, the mean and variations of the filtered type are evaluated unit-by-unit for each size. The application of filtering has an advantage of intervening the times in the calculations in such a way that each sampling is effected by a coefficient of balance, which is at a maximum for the most recent value and decreases until the oldest value.

This means is very useful for realizing a precise sequence of each of the units, because all anomalies can be detected very rapidly, which permits the earliest release of the securities (safety devices).

The calculations are as follows:

filtered: means $$Mf_i = \alpha(X_i + (1 - \alpha) Mf_{i-1}$$

$X_i$ = sampling
where $\alpha$ = filtering coefficient comprising between 0 and 1
$Mf_{i-1}$ = preceding filter mean variation of: the filtered type $$6f_i = \sqrt{M2f_i - (Mf_i)^2}$$

$Mf_i$ = filtered mean of coefficient $\alpha$(alpha)
where
$M2f_i$ = filtered mean of the squares of the sampling and of coefficient $\beta$ $$M2f_i = \beta(X_i)^2 + (1 - \beta) M2f_{i-1}$$

In the case where the seat exiting from the machine is empty, the block of data received by the level III contains the reason for the absence of the casing: based on if there has not occurred a feed at the entry of the machine, or based that the workpiece has been rejected by result of an inspection; in all cases, the level III can determine the unit which has rejected the workpiece and the exact reason for the rejection.

The rejection criteria are safeguarded in memory in the same manner as the sizes so as to be able to dispose of three types of data:

Percentage of rejects: permits a individual surveillance of each equipment and control unit.

Consecutive reject: permits a rapid detection of grave incidents (breakage of tools). Appropriate actions are taken by the system in case of a profusion of a predefined signal.

Total rejects: the cumulative total number for the operator's equipment and the lot of workpieces by motive.

By the surveillance of the consecutive rejects, a rough default on one unit can be detected very rapidly. (This reaction speed necessarily cannot be attained even with an average filter surveillance). Also, the system surveys the sequence of reject on each unit. An appropriate action is taken in case of a pre-established number of consecutive rejects is exceeded.

Additionally, a maximum percentage of the rejects is entered for each type of default. The percentage limits acceptable are defined by the user.

In order to detect a progressive wear of the tools, the user has the possibility to define a lateral limited play, within the sizes of the rejects used by the inspecting units. It is also possible, at the intervening system, to forecast an intervention of the operator.

The releasing actions by level III can be, according to the selected option: signal alarm on the display screen, alarm plus inhibition of the unit or alarm plus stopping of the machine.

One can in this way see that the choice of the numbers of working units and of the inspecting units, in combination with the measure of precise measuring, and with the particular hirarchy of the logic means of command, permits a centralized surveillance of particular precision and efficacy regarding the functioning of the assembly of the machine.

It is of course understood that the present invention is not limited to the mode of realization hereinabove described and extends to all variations which can be covered by the following claims.

We claim:

1. An installation for assembly line manufacture of workpieces wherein said workpieces move in a row along a production path at a generally uniform spacing, said installation comprising:

a feeding unit capable of receiving a stock of workpieces for machining, and placing them in a predetermined position on a sprocket wheel, at least one working unit, capable of defining a continuous flow of the workpieces between a honeycombed wheel upstream, which cooperates with the sprocket wheel, and a honeycombed wheel downstream, at least one working carousel being provided between the honeycombed wheels upstream and downstream, this working carousel being capable of effecting at least one operation of said machining, an inspecting unit comprising at least one inspecting carousel for a measuring operation relating to the above-mentioned work that has been performed by said working carousel, and command logic means capable of supervising and coordinating the action of the consecutive units keeping in account the continuous flow of the workpieces, while effecting, in real time, measures for each workpiece and ejecting those workpieces the measure of which is outside of a tolerance, characterized in that the number of seats (P) in the working carousel is larger than the number of seats (Q) in the inspecting carousel, these two numbers not being multiples, one of the other, that the logic command means comprises a basal logic arrangement capable of functioning for the acquisition, calibration and correction of measures, as a function of the calibration, by interaction with the inspecting unit, as well as a processing logic arrangement, for controlling said feeding unit, said working carousel and said inspecting unit and for surveilling the installation assembly, said processing logic arrangement including a first logic arrangement, which has a logic element for each of the units, the logic element associated with the inspecting unit being connected to the basal logic arrangement, all of which being disposed for commanding the ejection of workpieces, the measurement of which does not fall between maximum and minimum measurements defining said tolerance, the processing logic arrangement further including a second logic arrangement, connected to said logic elements of the first logic arrangement, as well as a general command keyboard, this second logic arrangement centralizes the assembly of the aforesaid arrangements of the installation, particularly the data relative to the workpiece emitted each time that the continuous flow progresses one seat, this data including an identification part which has at least one unit number P and one unit number Q, the indication of an eventual reject, and the measures effected, which permits the establishment in real time and in a simple manner, of a production statistic.

2. Installation according to claim 1, characterized in that several second logic arrangements are associated at different stubs of the production path which are connected to a single third logic arrangement, which receives at least the workpiece data, and is adapted for storing them, as well as for counting (QE) the number of the workpiece data received, which corresponds to the number of positions of which the continuous flow of workpieces has advanced, counting ($QF_i$) the number of workpieces exiting from the feeding unit, counting ($QD_i$) the number of workpieces fed to this site, counting ($QS_i$) the number of good workpieces exiting normally from the machine, and counting ($QR_{ijk}$) the total number of ejections on the stub of order i, on the seat j for a given motive k, and for determining the corresponding yields.

3. Installation according to claim 2, characterized that the third logic arrangement counts, additionally:

the total number ($QM_i$) of rejects on the inspecting unit, the number ($QL_i$) of the appropriate sampling, the numbers ($QV_i$) and ($QA_i$) of the appropriate workpieces and added, respectively, to the downstream stock, and the number ($QI_i$) of the pieces of the downstream stock or intermediary between two stubs.

4. Installation according to claim 2 or claim 3, characterized in that the third logic arrangement is caused to establish seat-by-seat, information filtered averagely, drift-type filtered, counting of ejections and percentage of ejections by motive, as well as to establish, without distinction of seat for each measurement, an average arithmetic mean, and a drift-type arithmetic mean.

5. Installation according to claim 2 or claim 3, characterized in that the third logic arrangement will conserve, in rapid approach, a preselected number of the last values of measurement for each selected seat.

6. Installation according to claim 2 or claim 3, characterized in that the third logic arrangement surveys the sequence of ejection for each seat and their arrival at a pre-established number of consecutive ejections.

7. Installation according to claim 2 or claim 3, characterized in that the third logic arrangement surveys the percentage of ejections for each type of default and compares them to the pre-established limits.

8. Installation according to claim 2 or claim 3, characterized in that the third logic arrangement compares the measured values to limit values comprised between the ejection values, which permits a surveillance of the wear of the tools.

9. Installation according to claim 2 or claim 3, characterized in that P=10 and Q=8.

* * * * *